United States Patent
Tu et al.

(10) Patent No.: US 8,035,326 B2
(45) Date of Patent: Oct. 11, 2011

(54) FAN AND CONTROLLING DEVICE THEREOF

(75) Inventors: Ya-Sen Tu, Taoyuan Hsien (TW); Lee-Long Chen, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 375 days.

(21) Appl. No.: 12/437,900

(22) Filed: May 8, 2009

(65) Prior Publication Data

US 2010/0181950 A1 Jul. 22, 2010

(30) Foreign Application Priority Data

Jan. 21, 2009 (TW) .............................. 98102173 A (51) Int. Cl.
*H02P 6/04* (2006.01)
*H02K 7/00* (2006.01)

(52) U.S. Cl. .................................. 318/400.11; 310/40.5

(58) Field of Classification Search ............. 318/400.11; 310/40.5

See application file for complete search history.

(56) References Cited

U.S. PATENT DOCUMENTS

2009/0218981 A1* 9/2009 Heckenbach ................. 318/799

\* cited by examiner

*Primary Examiner* — Thomas Dougherty
(74) *Attorney, Agent, or Firm* — Muncy, Geissler, Olds & Lowe, PLLC (57) ABSTRACT

A fan is electrically connected with an alternating current power source. The fan includes an impeller, a motor and a controlling device. The controlling device includes a commutating unit, a magnetic detecting unit, a first switching unit, a second switching unit, a third switching unit and a controlling unit. The alternating current power source is electrically connected with the first switching unit, the second switching unit and the commutating unit, respectively. The commutating unit is electrically connected with the magnetic detecting unit and the controlling unit, respectively. The controlling unit is electrically connected with the third switching unit and the first switching unit, respectively. The third switching unit is electrically connected with the second switching unit. The first switching unit and the second switching unit are electrically connected with the motor, respectively. A controlling device of the fan is also disclosed.

19 Claims, 9 Drawing Sheets

FAN AND CONTROLLING DEVICE THEREOF

CROSS REFERENCE TO RELATED APPLICATIONS

This Non-provisional application claims priority under 35 U.S.C. §119(a) on Patent Application No(s). 098102173, filed in Taiwan, Republic of China on Jan. 21, 2009, the entire contents of which are hereby incorporated by reference.

BACKGROUND OF THE INVENTION

1. Field of Invention

The present invention relates to a fan and the controlling device thereof, and in particular to a fan and the controlling device thereof having the frequency of a rotation rate equivalent to the frequency of an alternating current power source supplied to the fan.

2. Related Art

Figure 1:
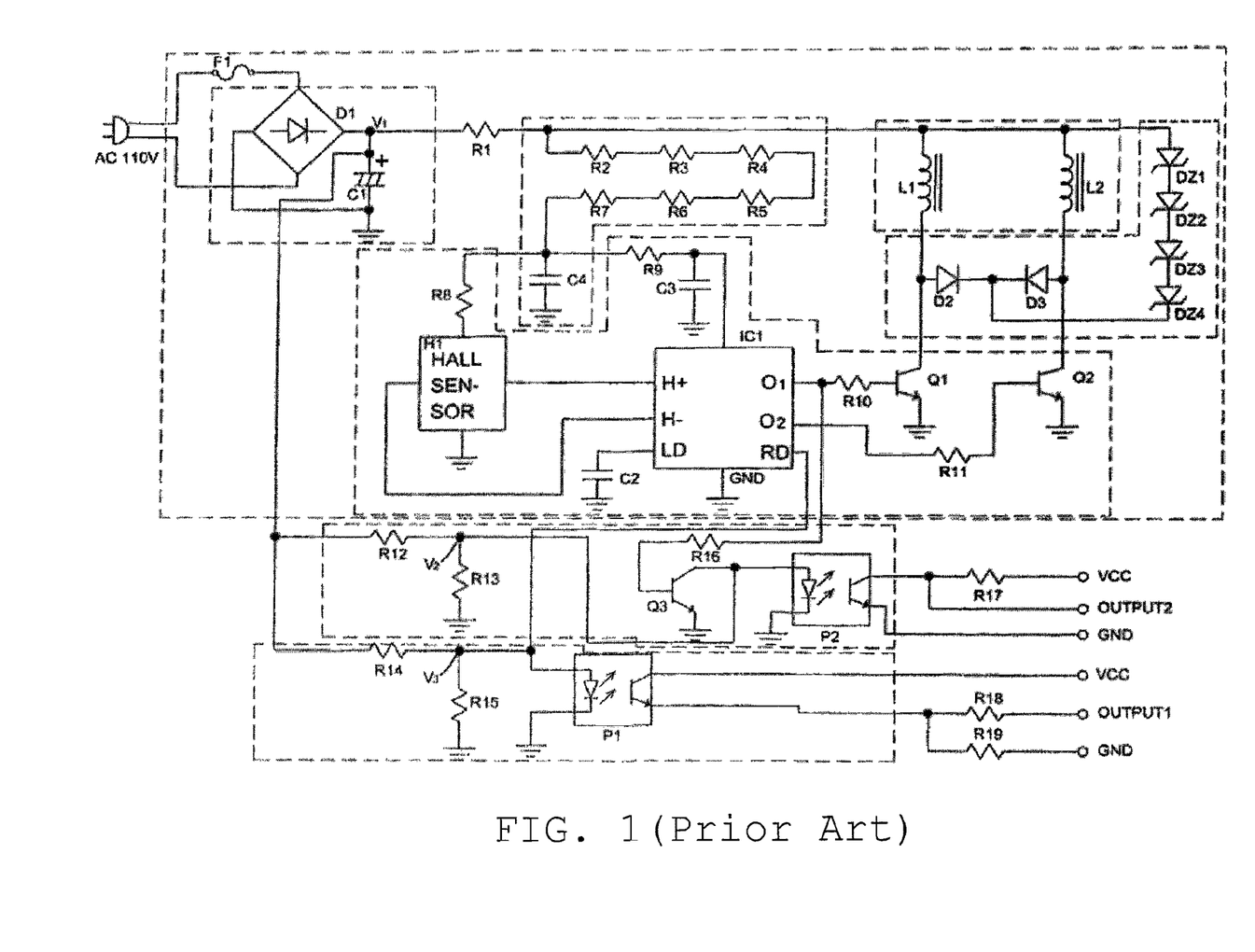
FIG. 1 is a motor control circuit of a conventional alternating current fan.
Figure 2A:
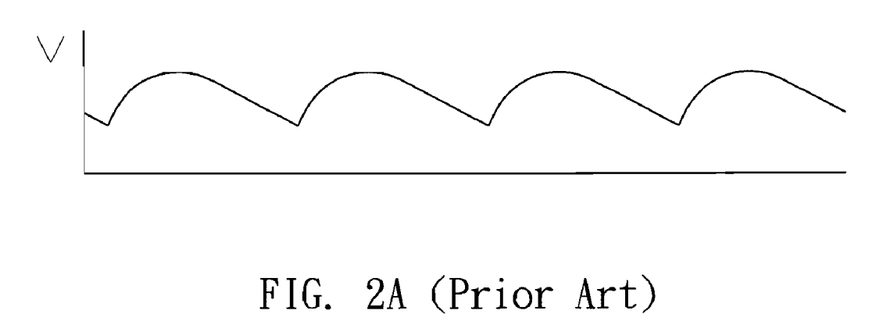
FIG. 2A and FIG. 2B are voltage wave diagrams of the motor of the conventional alternating current fan.
Figure 2B:
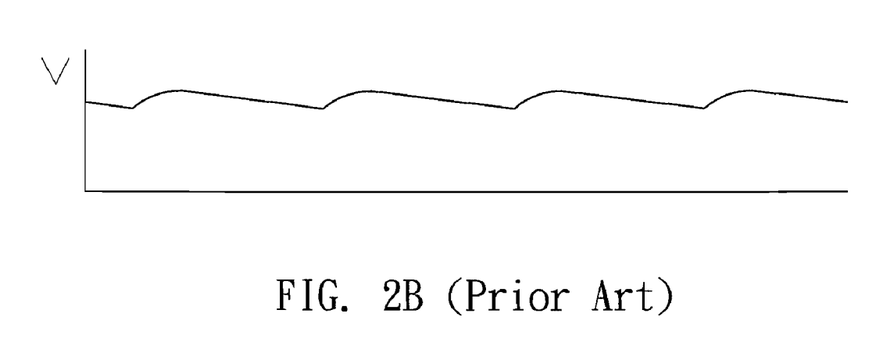

Please refer to FIG. 1, which shows a control circuit of a motor of a conventional alternating current fan. The voltages of the alternating current power source is rectified and regulated by the bridge rectification circuit D1 and the capacitor (C1) to be high direct-current voltages. Then, the high direct-current voltages are supplied to the coil L1 and the coil L2 of the motor. However, when the motor is overloaded or the capacitance of the capacitor (C1) is too small, the voltage supplied to the motor will generate ripple fluctuation (as shown in FIG. 2A); and the ripple will be smaller when the load of the motor is not so heavy or the capacitance of the capacitor (C1) is large (as shown in FIG. 2B).

Figure 3A:
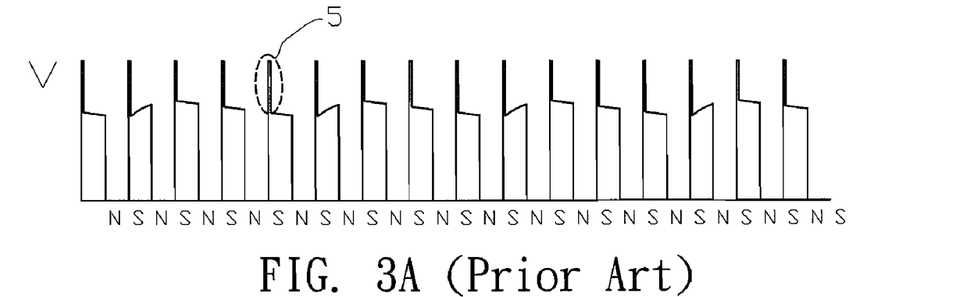
FIG. 3A to FIG. 3D are voltage wave diagrams of the coil of the motor of the conventional alternating current fan.
Figure 3B:
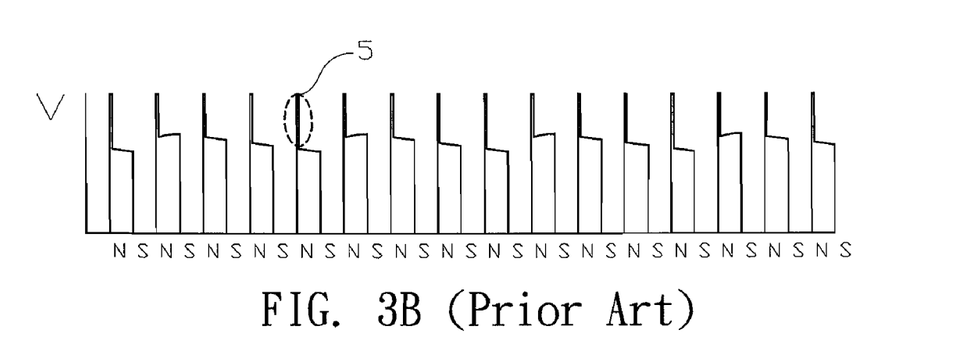
Figure 3C:
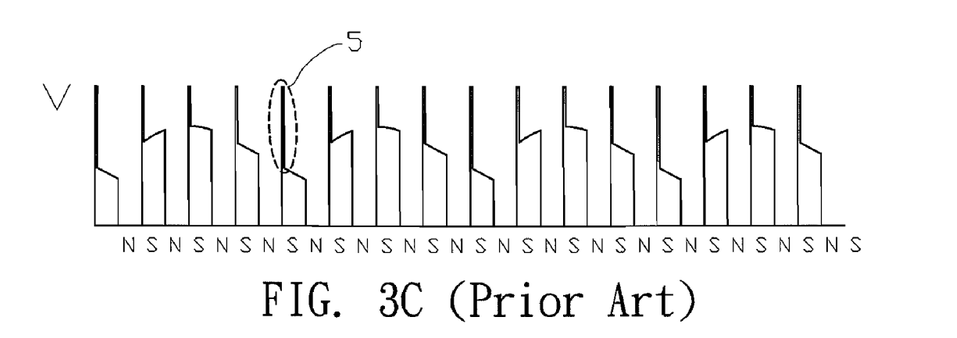
Figure 3D:
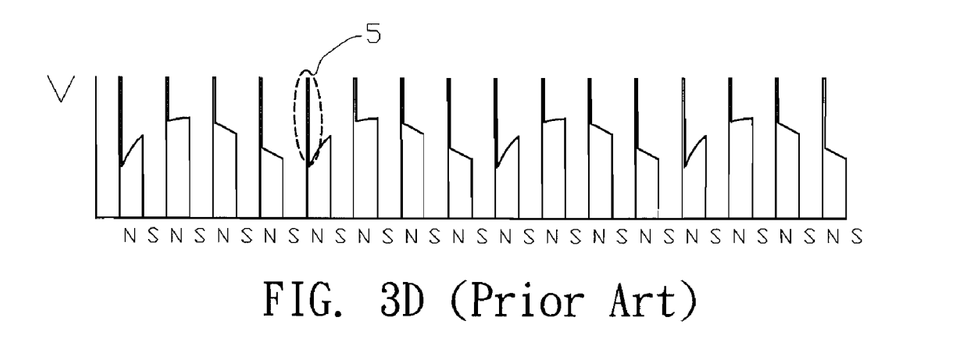

Moreover, the coil L1 and the coil L2 of the motor are electrified alternately in accordance with the frequency that the alternate magnetic poles (N pole or S pole) of the motor detected by the Hall sensor, and the frequency that the alternate magnetic poles of the motor detected by the Hall sensor is not equivalent to the frequency of the alternating current power, so that the voltages on the coil L1 and the coil L2 of the motor are shown in FIG. 3A and FIG. 3B, the surge voltage 5 is generated because of the inverse electromotive force of the inductance of the motor, this not only results in high temperature on the transistors Q1 and Q2 and the Zener diodes Zd1, Zd2, Zd3 and Zd4, but also make noises when the motor is rotating. Especially, as shown in FIG. 3C and FIG. 3D, the surge voltage 5 is more obvious when the load of the motor is heavier.

SUMMARY OF THE INVENTION

The present invention provides positive phase voltage signals and negative phase voltage signals of an alternating current power source to a motor, so as to make the frequency of the rotation rate of the motor to be equivalent to the frequency of the alternating current power source, and the switch moment between the alternating N pole and S pole of the motor is (almost) the same as the intersection point of positive phase and negative phase of the sine wave of the alternating current power source.

To achieve the above, the present invention discloses a controlling device of a fan. The controlling device is electrically connected with an alternating current power source and a motor of the fan for driving the motor to operate. The controlling device includes a commutating unit, a magnetic detecting unit, a first switching unit, a second switching unit, a third switching unit, a controlling unit, a temperature sensing unit and a warning unit. The commutating unit commutates the voltages of the alternating current power source into direct voltages and provides the direct voltages to the magnetic detecting unit and the controlling unit. The magnetic detecting unit detects alternate magnetic poles states of the motor and outputs a first voltage signal when the detected magnetic pole of the motor is N pole, and the magnetic detecting unit outputs a second voltage signal when the detected magnetic pole of the motor is S pole.

To achieve the above, the present invention also discloses a fan which is electrically connected with an alternating current power source. The fan includes an impeller, a motor and a controlling device. The motor is connected with the impeller for rotating the impeller. The controlling device is electrically connected with the alternating current power source and the motor for driving the motor to operate. The controlling device includes a commutating unit, a magnetic detecting unit, a first switching unit, a second switching unit, a third switching unit, a controlling unit, a temperature sensing unit and a warning unit. The commutating unit commutates the voltages of the alternating current power sources into direct voltages and provides the direct voltages to the magnetic detecting unit and the controlling unit. The magnetic detecting unit detects alternate magnetic poles states of the motor and outputs a first voltage signal when the detected magnetic pole of the motor is N pole, and the magnetic detecting unit outputs a second voltage signal when the detected magnetic pole of the motor is S pole.

The first switching unit mentioned above is electrically connected with the alternating current power source and the motor, respectively, and the first switching unit is for receiving a positive phase voltage signal of the alternating current power source and outputting the positive phase voltage signal to the motor. The second switching unit is electrically connected with the alternating current power source and the motor, respectively, and the second switching unit is for receiving a negative phase voltage signal of the alternating current power source and outputting the negative phase voltage signal to the motor. The third switching unit is switched on or off according to the voltage signals outputted by the controlling unit, so as to switch on or off the second switching unit. The controlling unit receives the first voltage signal and the second voltage signal and controls the first switching unit and the second switching unit according to the first voltage signal and the second voltage signal. After the motor is started and when a frequency of a rotation rate of the motor is equivalent to the frequency of the alternating current power source, the controlling unit controls the motor to keep rotating at a constant rotation rate.

The temperature sensing unit mentioned above senses the temperature of the motor and provides different voltage signals to the controlling unit according to the sensed temperatures. When the sensed temperature is too low, the controlling unit switches off the first switching unit and the second switching unit. Besides, when the rotation rate of the motor determined by the controlling unit is unusual, a warning signal will be generated by the warning unit.

BRIEF DESCRIPTION OF THE DRAWINGS

The present invention will be fully understood from the subsequent detailed description and accompanying drawings, which are given by way of illustration only, and thus are not limitative of the present invention, and wherein.

DETAILED DESCRIPTION OF THE INVENTION

The preferred embodiment of a fan and controlling device thereof of the present invention will be apparent from the following detailed description, which proceeds with reference to the accompanying drawings, wherein the same references relate to the same elements.

Figure 4:
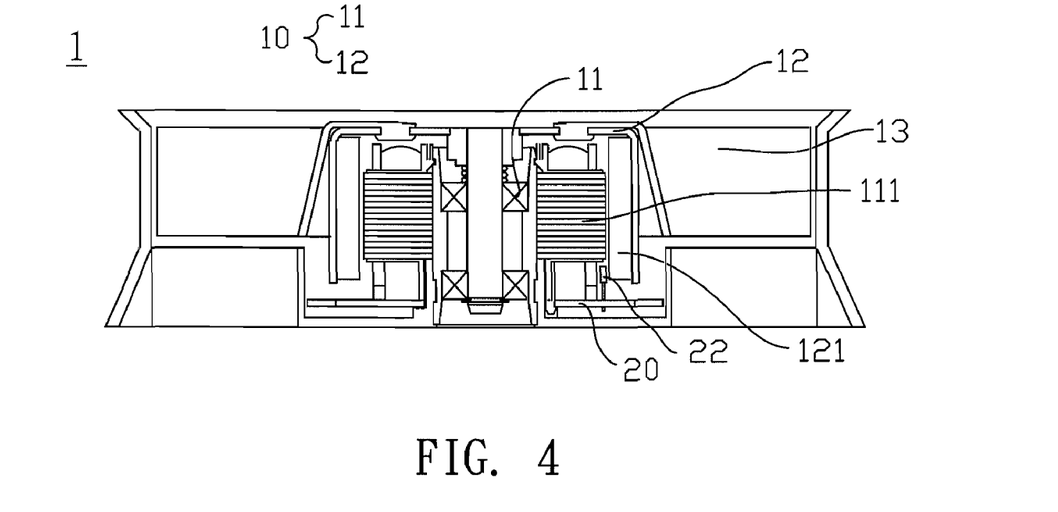
FIG. 4 is sectional view of a fan according to the preferred embodiment of the present invention.
Figure 5:
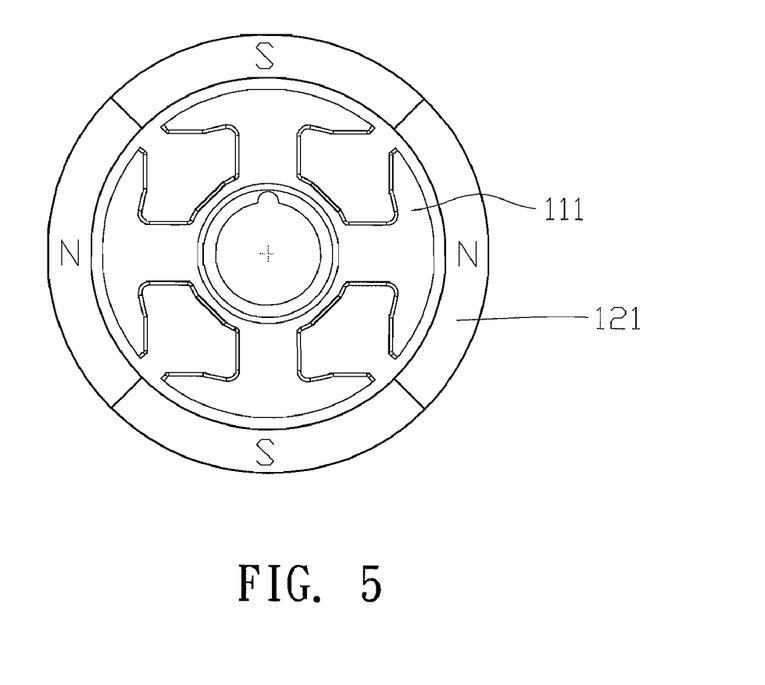
FIG. 5 is a top view of the rotor and the stator of the fan according to the preferred embodiment of the present invention.

Please refer to both FIG. 4 and FIG. 5, a fan 1 (an alternating current fan for example) according to a preferred embodiment of the present invention includes a motor 10 and an impeller 13, wherein the stator 11 of the motor 10 includes four silicon steel sheets 111, and several coils are wound on the four silicon steel sheets 111. The rotor 12 is disposed around the stator 11. The rotor 12 includes a magnetic ring 121, and the magnetic ring 121 includes four magnetic poles (which are N, S, N, S poles arranged alternately) in this embodiment, but it is not limited thereto, the number of the magnetic poles of the magnetic ring 121 can be over and above two (N and S poles). The fan 1 and its motor 10 are driven by a controlling device 2 (please refer to FIG. 6).

Figure 6:
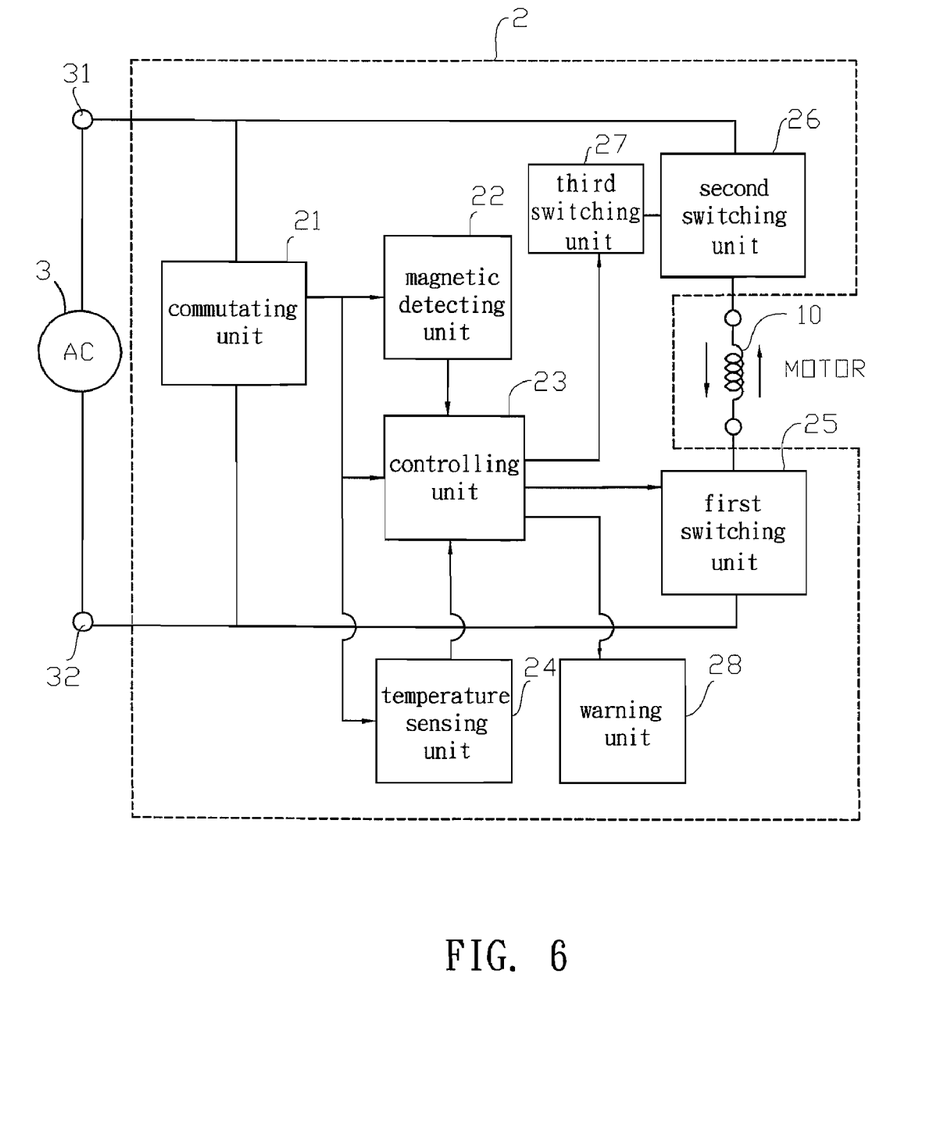
FIG. 6 is a circuit block diagram of a controlling device according to the preferred embodiment of the present invention.

Please refer to FIG. 6, the controlling device 2 of the present invention is electrically connected with an alternating current power source 3 and the motor 10, and the controlling device 2 is for driving the motor 10 to operate. The controlling device 2 includes a commutating unit 21, a magnetic detecting unit 22, a controlling unit 23, a temperature sensing unit 24, a first switching unit 25, a second switching unit 26, a third switching unit 27 and a warning unit 28. Please refer to FIG. 4, the above-mentioned units of the controlling device 2 can be disposed on the printed circuit board 20, and the printed circuit board 20 can be disposed on the motor 10.

The first switching unit 25 and the second switching unit 26 are electrically connected with the two output ends of the alternating current power source 3, respectively, and the commutating unit 21 is also electrically connected with the two output ends of the alternating current power source 3. Besides, the commutating unit 21 is electrically connected with the magnetic detecting unit 22, the controlling unit 23 and the temperature sensing unit 24, respectively. The controlling unit 23 is electrically connected with the magnetic detecting unit 22, the temperature sensing unit 24, the third switching unit 27, the warning unit 28 and the first switching unit 25, respectively. The third switching unit 27 is electrically connected with the second switching unit 26. The first switching unit 25 and the second switching unit 26 are electrically connected with the motor 10, respectively.

Figure 7:
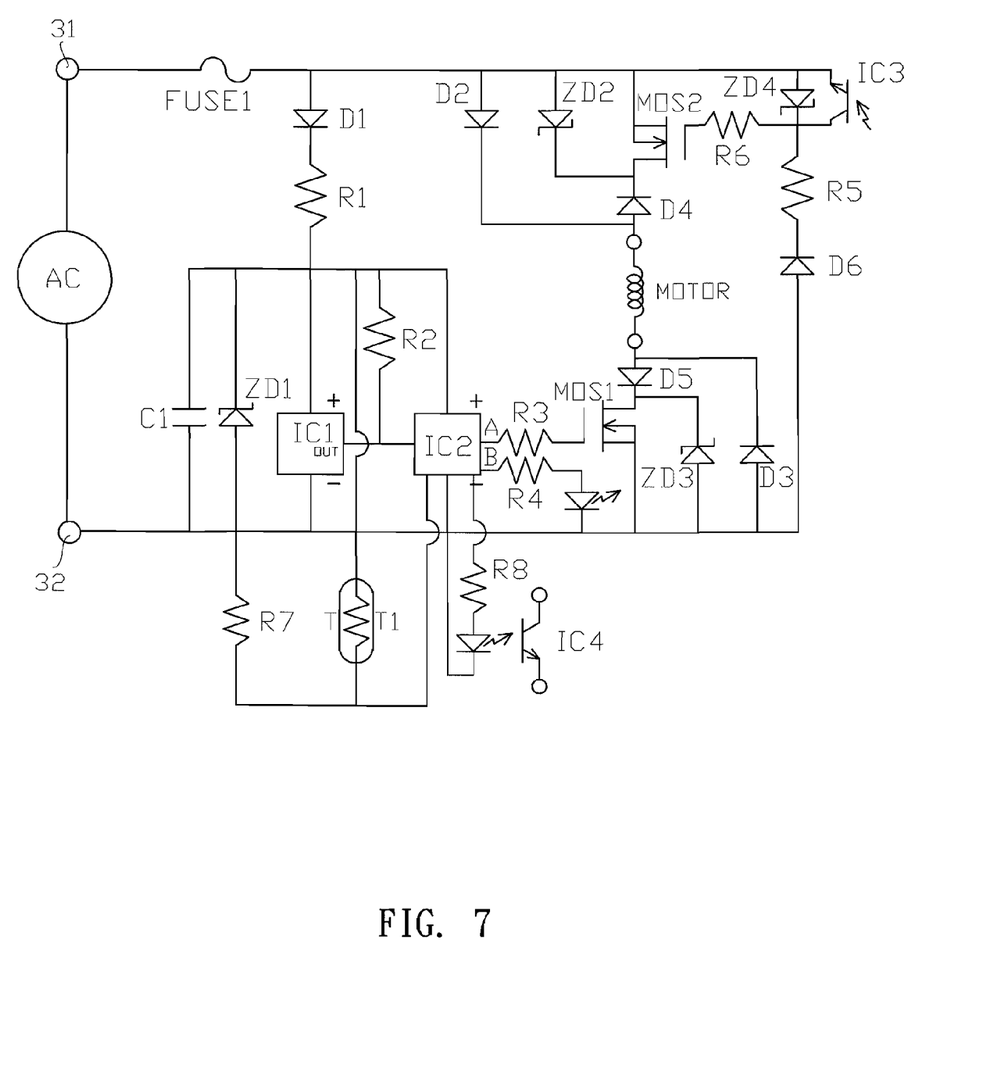
FIG. 7 is a circuit diagram of the controlling device of FIG. 6.

Please refer to both FIG. 6 and FIG. 7, the commutating unit 21 includes a first diode (D1), a first resistor (R1), a first capacitor (C1) and a first Zener diode (ZD1) in this embodiment. The first end of the first diode (D1) is electrically connected with the first output end 31 of the alternating current power source 3, and the second end of the first diode (D1) is electrically connected with the first end of the first resistor (R1), and the second end of the first resistor (R1) is electrically connected with the first end of the first capacitor (C1) and the first end of the first Zener diode (ZD1), respectively. The second end of the first capacitor (C1) is electrically connected with the second end of the first Zener diode (ZD1) and the second output end 32 of the alternating current power source 3, respectively.

The magnetic detecting unit 22 includes a Hall element (IC1) and a second resistor (R2). The two input ends of the Hall element (IC1) are electrically connected with the second end of the first resistor (R1) and the second output end 32 of the alternating current power source 3, respectively. The first end of the second resistor (R2) is connected with the input end of the Hall element (IC1), the second end of the second resistor (R2) is connected with the output end of the Hall element (IC1). The Hall element (IC1) detects the alternate magnetic poles states of the magnetic ring 121 of the rotor 12 of the motor 10, and the Hall element (IC1) outputs a high voltage signal when the detected magnetic pole of the motor 10 is N pole, and the Hall element (IC1) outputs a low voltage signal when the detected magnetic pole of the motor 10 is S pole.

The controlling unit 23 can be the microcontroller (IC2) electrically connected with the input end and the output end of the Hall element (IC1). The microcontroller (IC2) receives the high voltage signal or the low voltage signal outputted by the Hall element (IC1) and controls the positive phase controlling switch (MOS1) of the first switching unit 25 and the negative phase controlling switch (MOS2) of the second switching unit 26 according to the high voltage signal or the low voltage signal outputted by the Hall element (IC1). The microcontroller (IC2) also controls the negative phase controlling switch (MOS2) by the first optical coupler (IC3) of the third switching unit 27.

The temperature sensing unit 24 includes a thermistor (T1) and a seventh resistor (R7). The first end of the thermistor (T1) is electrically connected with the second end of the first resistor (R1), and the second end of the thermistor (T1) is electrically connected with the first end of the seventh resistor (R7) and the microcontroller (IC2), respectively. The second end of the seventh resistor (R7) is electrically connected with the second output end 32 of the alternating current power source 3. The temperature sensing unit 24 senses the temperature around the thermistor (T1) and provides different voltage signals to the microcontroller (IC2) according to the sensed temperatures. When the sensed temperature is too low, the microcontroller (IC2) switches off the positive phase controlling switch (MOS1) and the negative phase controlling switch (MOS2) according to the voltage signal, so as to stop the fan 1 and its motor 10.

The first switching unit 25 includes the positive phase controlling switch (MOS1) (a MOSFET for example), a third resistor (R3), a fifth diode (D5) and a third Zener diode (ZD3). The first end of the third resistor (R3) is electrically connected with a first output end (A) of the microcontroller (IC2), and the second end of the third resistor (R3) is electrically connected with the gate electrode (G) of the positive phase controlling switch (MOS1). The drain electrode (D) and the source electrode (S) of the positive phase controlling switch (MOS1) are electrically connected with the cathode of the fifth diode (D5) and the second output end 32 of the alternating current power source 3, respectively, and the anode of the fifth diode (D5) is electrically connected with the motor 10. The first end and the second end of the third Zener diode (ZD3) are electrically connected with the drain electrode (D) of the positive phase controlling switch (MOS1) and the second output end 32 of the alternating current power source 3, respectively.

The third switching unit 27 includes the first optical coupler (IC3), a fourth resistor (R4) and a fourth Zener diode (ZD4). The first end of the fourth resistor (R4) is electrically connected with a second output end (B) of the microcontroller (IC2), and the second end of the fourth resistor (R4) is electrically connected with the first end of the transmitting part of the first optical coupler (IC3), and the second end of the transmitting part of the first optical coupler (IC3) is electrically connected with the second output end 32 of the alternating current power source 3. The fourth Zener diode (ZD4) is parallel connected with the receiving part of the first optical coupler (IC3).

The second switching unit 26 includes the negative phase controlling switch (MOS2) (a MOSFET for example), a fourth diode (D4), a sixth resistor (R6) and a second Zener diode (ZD2). The first end of the fourth resistor (R4) is electrically connected with the receiving part of the first optical coupler (IC3), and the second end of the fourth resistor (R4) is electrically connected with the gate electrode (G) of the negative phase controlling switch (MOS2). The drain electrode (D) and the source electrode (S) of the negative phase controlling switch (MOS2) are electrically connected with the cathode of the fourth diode (D4) and the first output end 31 of the alternating current power source 3, respectively. The anode of the fourth diode (D4) is electrically connected with the motor 10. The first end and the second end of the second Zener diode (ZD2) are electrically connected with the drain electrode (D) of the negative phase controlling switch (MOS2) and the first output end 31 of the alternating current power source 3, respectively.

The warning unit 28 includes a second optical coupler (IC4) and a eighth resistor (R8). The first end of the transmitting part of the second optical coupler (IC4) is electrically connected with the microcontroller (IC2), and the second end of the transmitting part of the second optical coupler (IC4) is electrically connected with the first end of the eighth resistor (R8). The second end of the eighth resistor (R8) is electrically connected with the microcontroller (IC2). Besides, the receiving part of the second optical coupler (IC4) can also be electrically connected with an electronic element capable of emitting light or voice such as a light-emitting diode or a buzzer. The microcontroller (IC2) may determine whether the rotation rate of the motor 10 is unusual (such as too slow or breaking) according to the voltage signals transmitted by the Hall element (IC1) or other magnetic detecting elements, and when the rotation rate of the motor 10 determined by the microcontroller (IC2) is unusual, the microcontroller (IC2) outputs an warning signal to the second optical coupler (IC4) by way of the eighth resistor (R8), then the second optical coupler (IC4) will drive the light-emitting diode or the buzzer electrically connected with the second optical coupler (IC4) to emit light or voice, so as to give the alarm.

Figure 8A:
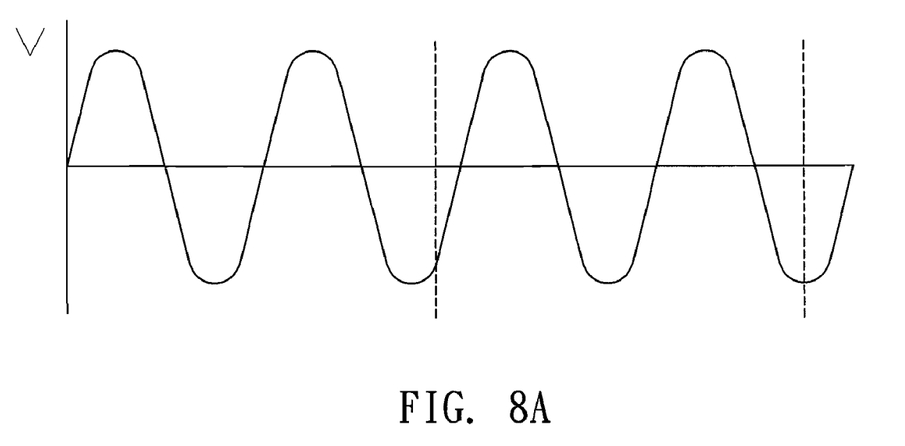
FIG. 8A to FIG. 8C are diagrams showing the voltage wave on the coil of the motor and the alternate magnetic poles states of the motor detected by the Hall element during the initial stage of the starting of the motor.
Figure 8B:
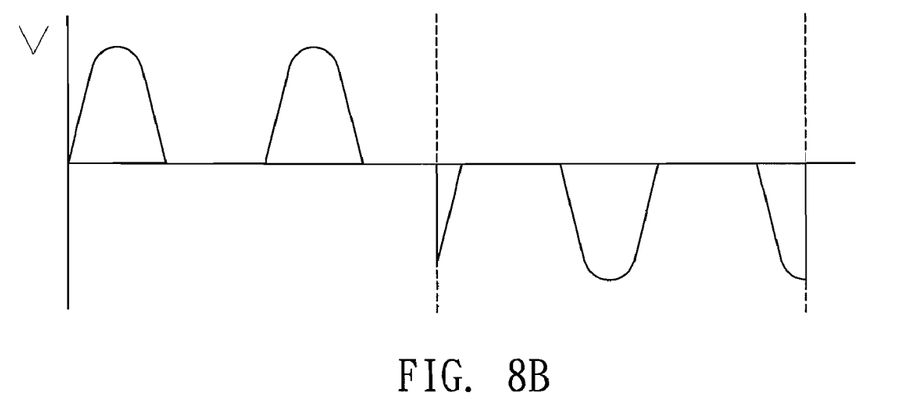
Figure 8C:
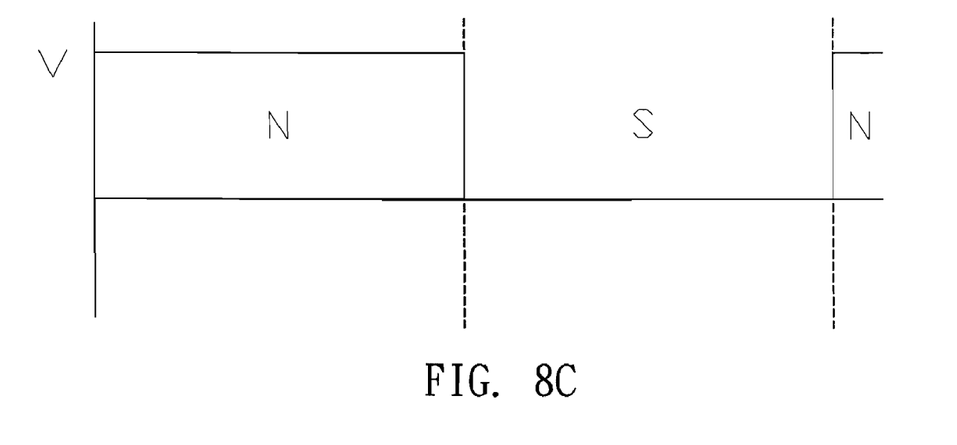

Please refer to FIG. 7 to FIG. 11B, when the controlling device 2 is electrically connected with the alternating current power source 3 whose frequency is 60 Hz (as shown in FIG. 8A), the sine wave alternating current voltage outputted by the alternating current power source 3 will pass through the fuse and then pass through two routes. One part of the alternating voltages will be commutated to be direct voltages by the first diode (D1) and the first resistor (R1) of the commutating unit 21, and then the direct voltages will be regulated by the first capacitor (C1) and the first Zener diode (ZD1), so as to provide the Hall element (IC1), the microcontroller (IC2) and the thermistor (T1) with fractional direct voltage; and another part of the alternating currents will be supplied to the motor 10 by way of the positive phase controlling switch (MOS1) or the negative phase controlling switch (MOS2). During the initial stage of the starting of the motor, the Hall element (IC1) detects the alternate magnetic poles (N pole or S pole) states of the magnetic ring 121 of the rotor 12 of the motor 10 and then outputs high or low voltage signals of lower frequency (as shown in FIG. 8C) to the microcontroller (IC2), and in the meanwhile the voltages received by the coils of the stator 11 of the motor 10 are shown in FIG. 8B, i.e., when the detected magnetic pole of the magnetic ring 121 of the rotor 12 of the motor 10 is N pole, only the positive phase voltage signals are received by the coils of the stator 11 of the motor 10; and when the detected magnetic pole of the magnetic ring 121 of the rotor 12 of the motor 10 is S pole, only the negative phase voltage signals are received by the coils of the stator 11 of the motor 10.

Because when the detected magnetic pole of the magnetic ring 121 of the rotor 12 of the motor 10 is N pole, the Hall element (IC1) outputs high voltage signals to the microcontroller (IC2), so that both the first output end (A) and the second output end (B) of the microcontroller (IC2) output high voltage signals. The high voltage signals outputted by the first output end (A) passes through the third resistor (R3) and then electrify the positive phase controlling switch (MOS1), so that the positive phase voltage signals outputted by the first output end 31 of the alternating current power source 3 can be supplied to the motor 10 by way of the second diode (D2) and then passes through the fifth diode (D5) and the positive phase controlling switch (MOS1), so as to form a first electrical circuit. The high voltage signals outputted by the second output end (B) passes through the fourth resistor (R4) and then be transmitted to the first optical coupler (IC3), so as to start the first optical coupler (IC3) and make the fourth Zener diode (ZD4) to be short-circuited, this results in low voltage on the sixth resistor (R6), and consequently, the negative phase controlling switch (MOS2) can not be electrified and the negative phase voltage signals outputted by the second output end 32 of the alternating current power source 3 can not pass through the negative phase controlling switch (MOS2).

When the detected magnetic pole of the magnetic ring 121 of the rotor 12 of the motor 10 is S pole, the Hall element (IC1) outputs low voltage signals to the microcontroller (IC2), so that both the first output end (A) and the second output end (B) of the microcontroller (IC2) output low voltage signals. The low voltage signals outputted by the first output end (A) can not electrify the positive phase controlling switch (MOS1) after passing through the third resistor (R3), so that the positive phase voltage signals outputted by the first output end 31 of the alternating current power source 3 can not pass through the positive phase controlling switch (MOS1). The low voltage signals outputted by the second output end (B) are transmitted to the first optical coupler (IC3) after passing through the fifth resistor (R5) but can not start the first optical coupler (IC3), and the negative phase voltage signals outputted by the second output end 32 of the alternating current power source 3 passes through the sixth diode (D6), the fifth resistor (R5) and the sixth resistor (R6) and then electrify the negative phase controlling switch (MOS2), in the meanwhile, the negative phase voltage signals outputted by the second output end 32 of the alternating current power source 3 also passes through the third diode (D3), the motor 10, the fourth diode (D4) and the negative phase controlling switch (MOS2), so as to form a second electrical circuit.

Figure 9A:
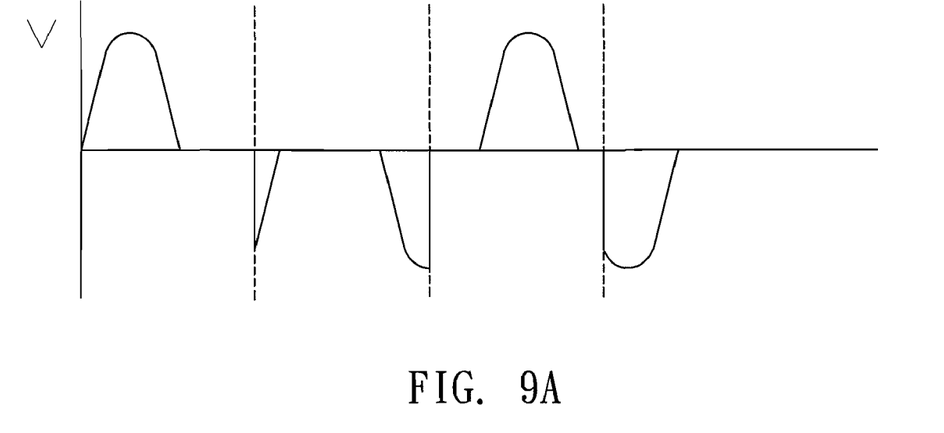
FIG. 9A and FIG. 9B are diagrams showing the voltage wave on the coil of the motor and the alternate magnetic poles states of the motor detected by the Hall element when the rotation rate of the motor increases.
Figure 9B:
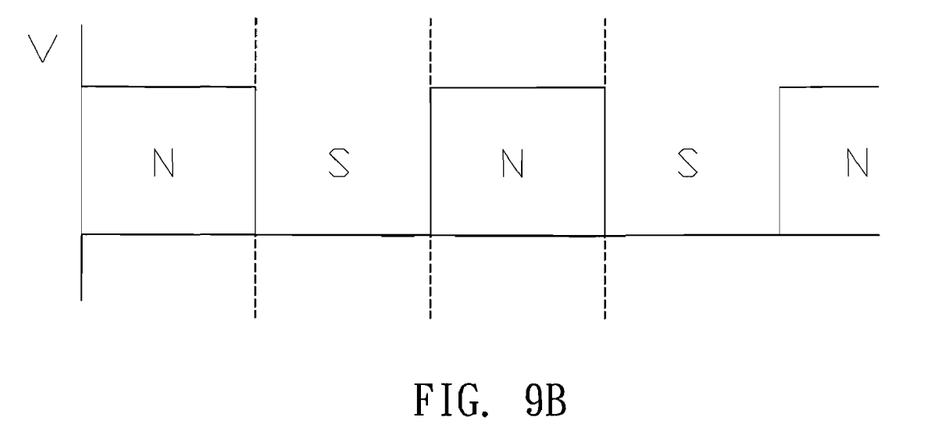

Please refer to FIG. 9B, when the rotation rate of the motor 10 (or the fan 1) increases, the Hall element (IC1) detects the alternate magnetic poles (N pole or S pole) states of the magnetic ring 121 of the rotor 12 of the motor 10 and then outputs high or low voltage signals of higher frequency, and in the meanwhile the voltages received by the coils of the stator 11 of the motor 10 are shown in FIG. 9A, some of the voltage wave are cut off because the rotation rate of the motor 10 is not equivalent to the frequency of the alternating current power source 3 when the magnetic poles of the magnetic ring 121 of the rotor 12 of the motor 10 are alternating between N pole or S pole, and surge voltages and noises are also generated in the meantime.

Figure 10A:
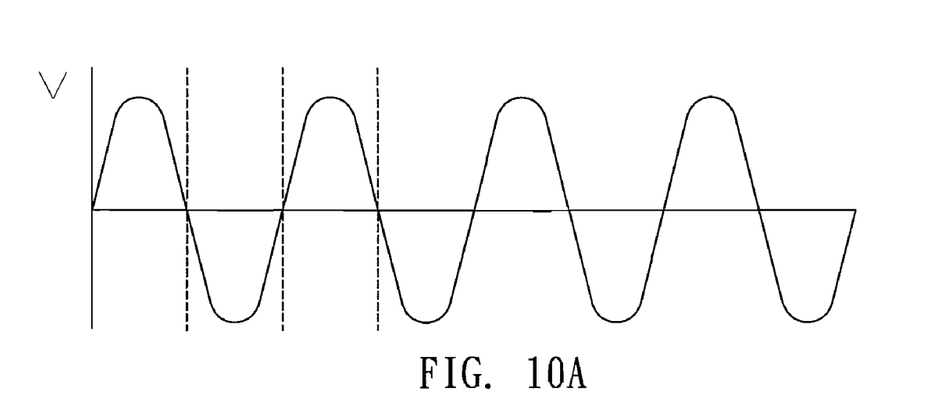
FIG. 10A and FIG. 10B are diagrams showing the voltage wave on the coil of the motor and the alternate magnetic poles states of the motor detected by the Hall element while the motor keeps rotating at a constant rotation rate.
Figure 10B:
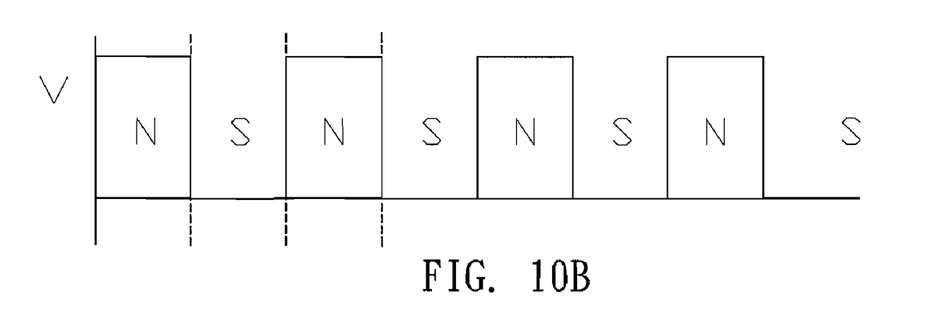

Please refer to FIG. 10A and FIG. 10B, the rotation rate of the motor 10 keeps increasing until the frequency of the rotation rate of the motor 10 is equivalent to the frequency of the alternating current power source 3 (which is 60 Hz), and then the motor 10 keeps rotating at this constant rotation rate (which will not exceed the frequency of the alternating current power source 3). For instance, the silicon steel sheets 111 of the stator 11 includes four poles, and the magnetic ring 121 of the rotor 12 includes four magnetic poles, the time that the magnetic ring 121 of the motor turns a round is equivalent to the time of two sine waves of the alternating current power source 3, i.e., the rotation rate of the motor 10 should be 1800 r.p.m (1800=60*60/2) when the frequency of the alternating current power source 3 is 60 Hz. Besides, because the motor 10 keeps rotating at the constant rotation rate and the frequency of the rotation rate of the motor 10 is equivalent to the frequency of the alternating current power source 3, surge voltage can be avoided and noise can be reduced when the magnetic poles of the magnetic ring 121 of the rotor 12 of the motor 10 alternate between N pole and S pole.

Figure 11A:
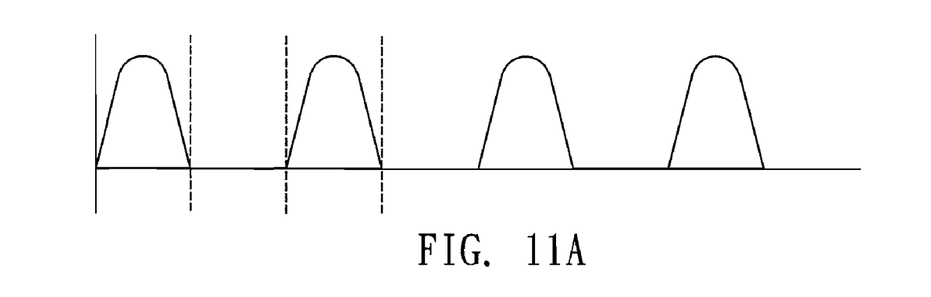
FIG. 11A and FIG. 11B are diagrams showing the voltage wave on the coil of the motor and the alternate magnetic poles states of the motor detected by the Hall element while the motor is under a power-saving status.
Figure 11B:
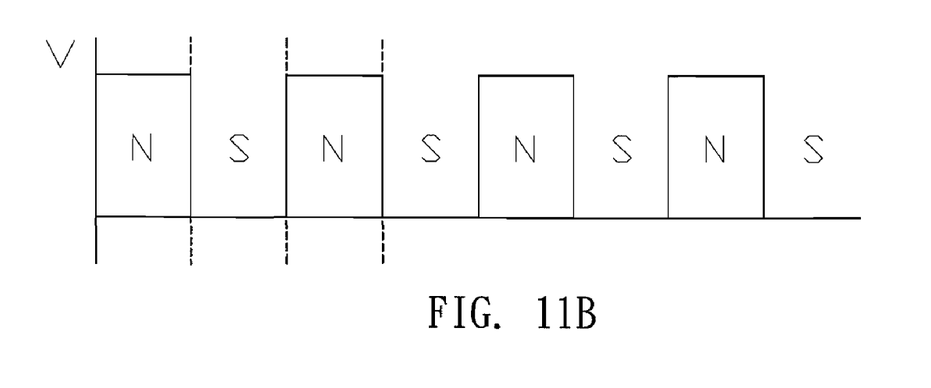

Please refer to FIG. 11A and FIG. 11B, the present invention also achieves a power-saving purpose, because the microcontroller (IC2) can switch off the negative phase controlling switch (MOS2) when the motor 10 keeps rotating at a frequency of a constant rotation rate which is equivalent to the frequency of the alternating current power source 3, so that the negative phase voltage signal outputted by the alternating current power source 3 will not be transmitted to the motor 10 and the electric currents supplied to the motor 10 can be reduced.

In summary, the present invention replace the conventional alternating current fan with direct current brushless motor and motor control circuit thereof for preventing the disadvantage of power consuming and low efficiency, and the present invention also has the advantage of easy producing and low cost. But in the control circuit of the conventional direct current brushless motor, the voltage of the alternating current power source is rectified to be high direct voltages and then be supplied to the motor, this often generate noises when the magnetic poles of the motor alternate between N pole and S pole and make the electronic elements of the motor to be over-heated. However, the present invention provides positive phase voltage signals and negative phase voltage signals of an alternating current power source to the motor, so as to make the rotation rate of the motor to be equivalent to the frequency of the alternating current power source by the easiest way. Besides, the switch moment between the alternating N pole and S pole of the motor is (almost) the same as the intersection point of positive phase and negative phase of the sine wave of the alternating current power source, so that noise can be avoided when the magnetic poles of the motor alternate between N pole and S pole. Furthermore, the present invention also has the capability of temperature controlling and alarm raising, so that the purpose of providing an intelligent multi-function product can be achieved.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A controlling device of a fan, the controlling device is electrically connected with an alternating current power source and a motor of the fan for driving the motor to operate, the controlling device comprising:
   a magnetic detecting unit for detecting alternate magnetic poles states of the motor, wherein the magnetic detecting unit outputs a first voltage signal when the detected magnetic pole of the motor is N pole, and the magnetic detecting unit outputs a second voltage signal when the detected magnetic pole of the motor is S pole;
   a first switching unit electrically connected with the alternating current power source and the motor, respectively, the first switching unit being for receiving a positive phase voltage signal of the alternating current power source and outputting the positive phase voltage signal to the motor so as to drive the motor;
   a second switching unit electrically connected with the alternating current power source and the motor, respectively, the second switching unit being for receiving a negative phase voltage signal of the alternating current power source and outputting the negative phase voltage signal to the motor so as to drive the motor; and
   a controlling unit (IC2) electrically connected with the magnetic detecting unit, the first switching unit and the second switching unit, respectively, the controlling unit being for receiving the first voltage signal and the second voltage signal and then controlling the first switching unit and the second switching unit according to the first voltage signal and the second voltage signal;
   wherein after the motor is started and when a frequency of a rotation rate of the motor is equivalent to a frequency of the alternating current power source, the controlling unit (IC2) controls the motor to keep rotating at a constant rotation rate.

2. The controlling device of a fan according to claim 1, further comprising a commutating unit electrically connected with the alternating current power source, the magnetic detecting unit and the controlling unit (IC2), respectively, wherein the commutating unit is for commutating the voltage of the alternating current power source into direct voltages and providing the direct voltages to the magnetic detecting unit and the controlling unit (IC2).

3. The controlling device of a fan according to claim 2, wherein the commutating unit comprises:

a first diode (D1) having a first end electrically connected with a first output end of the alternating current power source;

a first resistor (R1) having a first end electrically connected with a second end of the first diode (D1);

a first capacitor (C1) having a first end electrically connected with a second end of the first resistor (R1), and a second end of the first capacitor (C1) is electrically connected with a second output end of the alternating current power source; and a first Zener diode (ZD1) parallel connected with the first capacitor (C1).

4. The controlling device of a fan according to claim 1, wherein the magnetic detecting unit comprises:

a Hall element (IC1) for detecting alternate magnetic poles states of the motor, wherein the Hall element (IC1) outputs a high voltage signal when the detected magnetic pole of the motor is N pole, and the Hall element (IC1) outputs a low voltage signal when the detected magnetic pole of the motor is S pole; and a second resistor (R2) parallel connected with the Hall element (IC1).

5. The controlling device of a fan according to claim 1, wherein the first switching unit comprises:

a third resistor (R3) having a first end electrically connected with a first output end (A) of the controlling unit (IC2);

a positive phase controlling switch (MOS1) having a gate electrode (G) electrically connected with a second end of the third resistor (R3);

a fifth diode (D5) having an anode and a cathode electrically connected with the motor and a drain electrode (D) of the positive phase controlling switch (MOS1), respectively; and a third Zener diode (ZD3) having an anode and a cathode electrically connected with a source electrode (S) of the positive phase controlling switch (MOS1) and the drain electrode (D) of the positive phase controlling switch (MOS1), respectively.

6. The controlling device of a fan according to claim 1, further comprising a third switching unit electrically connected with the controlling unit (IC2) and the second switching unit, respectively, wherein the third switching unit is switched on or off according to a voltage signal outputted by the controlling unit (IC2), so as to switch on or off the second switching unit.

7. The controlling device of a fan according to claim 6, wherein the third switching unit comprises:

a fourth resistor (R4) having a first end electrically connected with a second output end (B) of the controlling unit (IC2);

a first optical coupler (IC3) electrically connected with a second end of the fourth resistor (R4); and a fourth Zener diode (ZD4) parallel connected with the first optical coupler (IC3).

8. The controlling device of a fan according to claim 7, wherein the second switching unit comprises:

a sixth resistor (R6) having a first end electrically connected with a output end of the first optical coupler (IC3);

a negative phase controlling switch (MOS2) having a gate electrode (G) electrically connected with a second end of the sixth resistor (R6);

a fourth diode (D4) having an anode and a cathode electrically connected with the motor and a drain electrode (D) of the negative phase controlling switch (MOS2), respectively; and a second Zener diode (ZD2) having an anode and a cathode electrically connected with a source electrode (S) of the negative phase controlling switch (MOS2) and the drain electrode (D) of the negative phase controlling switch (MOS2), respectively.

9. The controlling device of a fan according to claim 1, further comprising a temperature sensing unit for sensing a temperature of the motor and providing different voltage signals to the controlling unit (IC2) according to the sensed temperatures, wherein when the sensed temperature is too low, the controlling unit (IC2) switches off the first switching unit and the second switching unit.

10. The controlling device of a fan according to claim 9, wherein the temperature sensing unit comprises:

a thermistor (T1) electrically connected with the controlling unit (IC2); and a seventh resistor (R7) having a first end electrically connected with the thermistor (T1).

11. The controlling device of a fan according to claim 1, further comprising a warning unit electrically connected with the controlling unit (IC2), wherein when the rotation rate of the motor determined by the controlling unit (IC2) is unusual, a warning signal will be generated by the warning unit.

12. The controlling device of a fan according to claim 11, wherein the warning unit comprises:

a second optical coupler (IC4) having a transmitting part electrically connected with the controlling unit (IC2);

a eighth resistor (R8) having a first end electrically connected with the transmitting part of the second optical coupler (IC4), and a second end of the eighth resistor (R8) is electrically connected with the controlling unit (IC2); and a warning device electrically connected with a receiving end of the second optical coupler (IC4), and the warning device gives an alarm when the second optical coupler (IC4) receives the warning signal.

13. The controlling device of a fan according to claim 1, wherein when a frequency of a rotation rate of the motor is equivalent to a frequency of the alternating current power source, the controlling unit (IC2) switches off the second switching unit so that the negative phase voltage signal of the alternating current power source will not be received by the motor.

14. A fan electrically connected with an alternating current power source, the fan comprising:

an impeller;

a motor connected with the impeller for rotating the impeller; and a controlling device electrically connected with the alternating current power source and the motor for driving the motor to operate, the controlling device comprising:

a magnetic detecting unit for detecting alternate magnetic poles states of the motor, wherein the magnetic detecting unit outputs a first voltage signal when the detected magnetic pole of the motor is N pole, and the magnetic detecting unit outputs a second voltage signal when the detected magnetic pole of the motor is S pole;

a first switching unit electrically connected with the alternating current power source and the motor, respectively, for receiving a positive phase voltage signal of the alternating current power source and outputting the positive phase voltage signal to the motor, so as to drive the motor;

a second switching unit electrically connected with the alternating current power source and the motor, respectively, for receiving a negative phase voltage signal of the alternating current power source and outputting the negative phase voltage signal to the motor, so as to drive the motor; and a controlling unit (IC2) electrically connected with the magnetic detecting unit, the first switching unit and the second switching unit, respectively, for receiving the first voltage signal and the second voltage signal and then controlling the first switching unit and the second switching unit according to the first voltage signal and the second voltage signal;

wherein after the motor is started and when a frequency of a rotation rate of the motor is equivalent to a frequency of the alternating current power source, the controlling unit (IC2) controls the motor to keep rotating at a constant rotation rate.

15. The fan according to claim 14, wherein the controlling device further comprises a commutating unit electrically connected with the alternating current power source, the magnetic detecting unit and the controlling unit (IC2), respectively, wherein the commutating unit is for commutating the voltage of the alternating current power source into direct voltages and providing the direct voltages to the magnetic detecting unit and the controlling unit (IC2).

16. The fan according to claim 14, wherein the controlling device further comprises a third switching unit electrically connected with the controlling unit (IC2) and the second switching unit, respectively, wherein the third switching unit is switched on or off according to a voltage signal outputted by the controlling unit (IC2), so as to switch on or off the second switching unit.

17. The fan according to claim 14, wherein the controlling device further comprises a temperature sensing unit for sensing a temperature of the motor and providing different voltage signals to the controlling unit (IC2) according to the sensed temperatures, wherein when the sensed temperature is too low, the controlling unit (IC2) switches off the first switching unit and the second switching unit.

18. The fan according to claim 14, wherein the controlling device further comprises a warning unit electrically connected with the controlling unit (IC2), wherein when the rotation rate of the motor determined by the controlling unit (IC2) is unusual, a warning signal will be generated by the warning unit.

19. The fan according to claim 14, wherein when a frequency of a rotation rate of the motor is equivalent to a frequency of the alternating current power source, the controlling unit (IC2) switches off the second switching unit so that the negative phase voltage signal of the alternating current power source will not be received by the motor.

* * * * *